Patented Dec. 12, 1939

2,183,019

UNITED STATES PATENT OFFICE 2,183,019

PROCESS FOR HYDROGENATING MONO NITRATED PHENOLS

Clyde O. Henke, Wilmington, Del., William A. Douglass, Penns Grove, and Roland G. Benner, Carneys Point, N. J., assignors to E. I. du Pont de Nemours & Company, Wilmington, Del., a corporation of Delaware No Drawing. Application May 8, 1936, Serial No. 78,660

15 Claims. (Cl. 260—575)

This invention relates to a process for the manufacture of mono amino phenols and more particularly to the manufacture of para amino phenol and ortho amino phenol by catalytic hydrogenation in the liquid phase.

Although the mono amino phenols have heretofore been prepared by catalytic hydrogenation, an excessive amount of catalyst was required in order to secure attractive yields. Thus Popov, C. A. 28, 1670, used an amount of catalyst equal to nearly 10% of the weight of the nitrophenol which is prohibitive for economical manufacture.

This invention has as an object an improved and economical process for the production of mono amino phenols. A further object is to produce these amines economically by liquid phase hydrogenation of the corresponding nitrophenols in the presence of a nickel catalyst under practical operating conditions. A still further object is the production of para amino phenol and ortho amino phenol.

These objects are accomplished by the following invention which comprises catalytically hydrogenating mono nitro phenols in the liquid phase in the presence of a nickel catalyst, water, and an alkaline substance such as caustic soda. The mono nitro phenols may be ortho nitro phenol or para nitro phenol and these are reduced to the corresponding amines, ortho and para amino phenols. The hydrogenation is preferably carried out at 60° to 110° C. and at hydrogen pressures of 400 to 500 pounds per square inch in the presence of a nickel catalyst, water, and alkali. The alkaline substance such as caustic soda is added in suitable quantities to promote a more rapid and complete reduction and is essential in order to reduce the nitrophenols with a minimum amount of nickel catalyst. Without alkali the reduction becomes too slow before the reduction is complete and yields are low unless an excessive amount of nickel catalyst is used.

The following examples illustrate the invention:

Example 1

In an autoclave equipped for rapid agitation are charged 100 parts para nitro phenol (prepared from p-nitro chlorbenzene), 200 parts water, 3.7 parts nickel catalyst (containing about 25% reduced nickel), and 3 parts caustic soda. The pH value of this mixture is 6.7. The autoclave is closed and the nitrophenol is reduced at 60° to 110° C. and 400 to 500 pounds hydrogen pressure in about 3 to 5 hours. After hydrogen absorption has ceased, the pressure is released, and 150 parts more water are added. The mass is heated to above 100° C. and filtered. The filtrate contains para amino phenol, water and caustic soda which is neutralized by the addition of sodium bisulfite or acids such as hydrochloric acid or $SO_2$ dissolved in water. Para amino phenol crystallizes out of the filtration mass on cooling and may be isolated by filtration. The para amino phenol is white and is obtained in excess of 90% of the theoretical yield by crystallization as above described. The actual yield without mechanical losses is quantitative and can be isolated by other methods such as concentration of the mother liquor by evaporation and extraction of the para amino phenol from the residue with a suitable solvent.

Example 2

To 100 parts ortho nitro phenol (obtained from o-nitrochlorbenzene) in an autoclave equipped for rapid agitation are added 400 parts water, 4.4 parts nickel catalyst (containing about 25% reduced nickel), and 3 parts caustic soda. The autoclave is closed and the nitrophenol is reduced as in Example 1. After reduction 250 parts more water are added, and the mass is filtered at a temperature above 120° C. and then treated as in Example 1. The ortho amino phenol is white and is obtained in excess of 90% of the theoretical yield.

Example 3

One hundred parts of the sodium salt of para nitro phenol, obtained by treatment of para nitro chlorbenzene with caustic soda by known methods, is charged into an autoclave along with 50 parts water and 3 parts nickel catalyst. The pH value of this mixture is 9.6. The nitro group is reduced with hydrogen to the amine at 100° to 110° C. and 400 to 500 pounds hydrogen pressure. After the hydrogen absorption has ceased, the mass is filtered, and the filtrate is acidified with a solution of sulfur dioxide in water, or with some other acidic substance. The para amino phenol is isolated as in the preceding example. The sodium salt of ortho nitrophenol can be similarly reduced to produce ortho amino phenol.

This invention is not limited to the proportions of the various materials given in the preceding examples nor to the specific temperatures or pressures used in those examples. Temperatures of 50° to 175° C. and pressures of 100 to 2000 pounds per square inch and higher may be used. The speed of the reaction is increased by increasing either the temperature or the pressure, but better yields are obtained at low temperatures (60° to 110° C.). Higher pressures are advantageous but the advantages become small in the above 500 pounds. Less water than specified in the above examples may be used. Water equal to 5% of the weight of the nitrophenol or less may be used. More water may also be used. However, if an excessive amount of water (such as 15 times the weight of the nitrophenol) is used, the yield of isolated amino phenols is decreased due to the solubility of the amino phenols in the mother liquor. In general, the amount of water should not be more than about 6 to 10 times the weight of the nitrophenol.

One feature of this invention is the novel use of caustic soda in the hydrogenation of the nitrophenols. The amount of caustic soda given in Examples 1 and 2 gives good efficiency but more may be used. However, the additional caustic soda must be neutralized with some acidic substance in order to isolate the aminophenols and is therefore not economically desirable. Slightly less caustic may be used, but if the caustic soda content is too low the hydrogenation will not go to completion unless more catalyst is used. For instance, if in Examples 1 and 2 the caustic soda is not used and the other constituents and conditions are the same, the yield of isolated amino phenol is less than 80% and the quality of the amino phenol is poor. Caustic soda equal to 0.15% to 35% of the weight of the nitrophenol may be used. When using caustic soda of these amounts the minimum and maximum pH values of such mixtures containing water, caustic soda, and para nitro phenol are 6.0 and 11.6, respectively. The preferred pH value of the mixture, as is seen from Example 1, is about 6.7. The preferred amount is 3.0%. The caustic soda probably reacts with the nitro phenol and so is not present as free NaOH, but as sodium nitro phenolate as in Example 3. However, more than an equimolecular amount of caustic soda (30 to 35% of the weight of the nitrophenol) may be used. In this case, all of the nitro phenol probably reacts with the caustic and the caustic in excess of 1 mol is present as free NaOH. Other alkaline reagents may also be used. They may be free bases, such as caustic potash, barium hydroxide, and tetra ethyl ammonium hydroxide; or they may be salts of weak acids and strong bases such as sodium carbonate.

The amount of catalyst can be varied considerably. In Examples 1 and 2 the amount of reduced nickel in the catalyst is about 0.9% and 1.1%, respectively, of the weight of the nitro phenols. Less catalyst may be used, but the reduction will require a longer period of time. More catalyst also may be used but this is not economically desirable. Also, when the nickel in the catalyst becomes more than 5.0% of the weight of the nitro bodies, the amount becomes excessive and difficulties of removal, separation, and handling appear. Active nickel-containing catalysts, well known to the art, whether supported or not, may be used.

By the use of caustic soda or other alkaline reagents in suitable quantities in the hydrogen reduction of the nitrophenols, aminophenols of exceptional purity are obtained with a practical amount of nickel catalyst under conditions which are economically operable.

It is apparent that many widely different embodiments of this invention may be made without departing from the spirit and scope thereof and therefore it is not intended to be limited except as indicated in the appended claims.

We claim:
1. In the process of catalytically hydrogenating a mono-nitrated phenol in the liquid phase and in the presence of a nickel catalyst to a mono amino phenol at a temperature between about 50° C. and about 175° C. and at a pressure in excess of 100 lbs. per sq. in., the improvement which comprises adjusting the pH of the initial reactants to between about 6.0 and about 11.6.

2. In the process of catalytically hydrogenating a mono nitrated phenol in the liquid phase and in the presence of a nickel catalyst to a mono amino phenol at a temperature between about 50° C. and about 175° C. and at a pressure in excess of 100 lbs. per sq. in., the improvement which comprises carrying out the reaction with caustic soda added to the reactants in amounts sufficient to give a pH value to the initial mono nitrated phenol mixture of between about 6.0 and about 11.6.

3. The process in accordance with claim 2 characterized in that the caustic soda is added in an amount of about 3% by weight of the nitro body.

4. The process in accordance with claim 2 characterized in that the caustic soda is at least partially combined with the nitrophenol.

5. In the process of catalytically hydrogenating a mono nitrated phenol in the liquid phase in the presence of a nickel catalyst to a mono amino phenol at a temperature between about 50° C. and about 175° C. and at a pressure in excess of 100 lbs. per sq. in., the improvement which comprises hydrogenating the nitro phenol in the form of sodium nitro phenolate.

6. The process which comprises reacting a mono nitro phenol in the liquid phase with hydrogen in the presence of a nickel catalyst containing reduced nickel up to 5% by weight of the nitro body after adjusting the pH of the initial reactants to between about 6.0 and about 11.6.

7. The process which comprises reacting a mono nitro phenol in the liquid phase with hydrogen in the presence of a nickel catalyst containing reduced nickel up to 5% by weight of the nitro body with caustic soda added to the reactants in an amount sufficient to give a pH value to the initial mixture of between about 6.0 and about 11.6.

8. The process in accordance with claim 6 characterized in that the reaction is carried out in the presence of water in amounts from 1% to 1500% of the weight of the nitro body.

9. The process in accordance with claim 6 characterized in that the reaction is carried out at a temperature between 50° and 175° C. and at a pressure above 100 pounds per square inch.

10. The process in accordance with claim 6 characterized in that the reaction is carried out at a pressure between 400 and 500 pounds per square inch and at a temperature between 60° and 110° C.

11. The process in accordance with claim 6 characterized in that the nitro body is para nitro phenol.

12. The process in accordance with claim 6 characterized in that the nitro body is ortho nitro phenol.

13. The process for the production of para amino phenol which comprises reacting para nitro phenol in the liquid phase with hydrogen at a temperature from about 60° to about 110° C. and at a pressure from about 400 to about 500 pounds per square inch in the presence of a nickel catalyst, water, and caustic soda, said nickel catalyst containing reduced nickel in the amount of about 1% by weight of the nitro body, said water being present in an amount of about 200% by weight of the nitro body, and said caustic soda being present in an amount of about 3% by weight of the nitro body; adding water to the reacted mass in an amount equivalent to 150% by weight of the original nitro body, then filtering the resulting mixture, neutralizing the caustic soda in the filtrate, and recovering the para amino phenol from the filtrate by crystallization.

14. The process for the production of ortho amino phenol, which comprises reacting ortho nitro phenol in the liquid phase with hydrogen at a temperature from about 60° to about 110° C. and at a pressure from about 400 to about 500 pounds per square inch in the presence of a nickel catalyst, water, and caustic soda, said nickel catalyst containing reduced nickel in an amount of about 1% by weight of the nitro body, said water being present in an amount of about 400% by weight of the nitro body, and said caustic soda being present in an amount of about 3% by weight of the nitro body; adding water to the reacted mass in an amount of about 250% by weight of the nitro body, then filtering the resulting mixture, neutralizing the caustic soda in the filtrate, and recovering the ortho amino phenol from the filtrate by crystallization.

15. The process for the production of amino phenol, which comprises reacting sodium nitro phenolate in the liquid phase with hydrogen at a temperature from about 100° to about 110° C. and at a pressure from about 400 to about 500 pounds per square inch in the presence of a nickel catalyst containing reduced nickel in an amount of about 0.75% by weight of the sodium nitro phenolate and in the presence of water in an amount of about 50% by weight of the sodium nitro phenolate; filtering the reacted mass, acidifying the filtrate, and recovering the amino phenol by crystallization.

CLYDE O. HENKE.
WILLIAM A. DOUGLASS.
ROLAND G. BENNER.